United States Patent
Zhou et al.

(10) Patent No.: US 11,100,348 B2
(45) Date of Patent: Aug. 24, 2021

(54) METHOD OF LIVING BODY DETECTION AND TERMINAL DEVICE

(71) Applicant: Guangdong Oppo Mobile Telecommunications Corp., Ltd., Guangdong (CN)

(72) Inventors: Haitao Zhou, Guangdong (CN); Yibao Zhou, Guangdong (CN); Cheng Tang, Guangdong (CN); Xueyong Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/025,570

(22) Filed: Jul. 2, 2018

(65) Prior Publication Data
US 2019/0019046 A1 Jan. 17, 2019

(30) Foreign Application Priority Data
Jul. 17, 2017 (CN) .......................... 201710582818.2

(51) Int. Cl.
*G06K 9/00* (2006.01)
*G06K 9/38* (2006.01)
(Continued)

(52) U.S. Cl.
CPC ..... *G06K 9/00906* (2013.01); *G06K 9/00597* (2013.01); *G06K 9/38* (2013.01);
(Continued)

(58) Field of Classification Search
CPC ........... G06K 9/00791; G06K 9/00798; G06K 9/00805; G06K 9/00825; G06K 9/00369;
(Continued)

(56) References Cited

U.S. PATENT DOCUMENTS 7,155,050 B1 * 12/2006 Sloge ................. G06K 9/00127
382/133
9,147,269 B2 * 9/2015 Sakimoto ................. A61B 6/03
(Continued)

FOREIGN PATENT DOCUMENTS

CN 101539990 A 9/2009
CN 103530599 A 1/2014
(Continued)

OTHER PUBLICATIONS

Kim et al., "Face Liveness Detection using Variable Focusing," 2013 International Conference on Biometrics (ICB), IEEE Biometrics Compendium, Jun. 4-7, 2013.*
(Continued)

*Primary Examiner* — Edemio Navas, Jr.
*Assistant Examiner* — Kehinde Abimbola
(74) *Attorney, Agent, or Firm* — Young Basile Hanlon & MacFarlane, P.C.

(57) ABSTRACT

A method of living body detection performed with a terminal device includes the following operations. A first image for a target object is obtained via a camera at a first focal length, and a second image for the target object is obtained via the camera at a second focal length. A difference image of the first image and the second image is determined. Whether the target object is a living body is determined according to the difference image.

6 Claims, 7 Drawing Sheets

(51) Int. Cl.
| | |
|---|---|
| *G06K 9/46* | (2006.01) |
| *G06K 9/62* | (2006.01) |
| *H04N 5/232* | (2006.01) |
| *G06T 3/40* | (2006.01) |
| *G06T 5/00* | (2006.01) |

(52) U.S. Cl.
CPC .......... *G06K 9/469* (2013.01); *G06K 9/4642* (2013.01); *G06K 9/4647* (2013.01); *G06K 9/6215* (2013.01); *G06K 9/6276* (2013.01); *H04N 5/23212* (2013.01); *G06K 9/00617* (2013.01); *G06T 3/40* (2013.01); *G06T 5/00* (2013.01); *G06T 2207/10048* (2013.01); *G06T 2207/10148* (2013.01); *G06T 2207/20064* (2013.01); *G06T 2207/20081* (2013.01); *G06T 2207/20084* (2013.01); *G06T 2207/20224* (2013.01)

(58) Field of Classification Search
CPC .. G06K 9/00812; G06K 9/00818; G06K 9/00; G06K 9/00201; G06K 9/3233; G06K 9/4604; G06K 9/00906; G06K 9/00597; G06K 9/4647; A61B 5/02125; A61B 5/14552; A61B 5/0059; A61B 5/02007; A61B 5/0261; A61B 5/14551; A61B 5/6826; A61B 5/6838; A61B 5/0077; A61B 2576/00; A61B 5/0205; A61B 5/02416; A61B 5/02427; C12Q 1/6897; C12Q 1/02; C12Q 2525/207; C12Q 1/6886; G01N 33/48; G01N 21/17; G01N 21/64; G01N 27/026; G01N 33/4833; G01N 2333/70567; G01N 33/5014; H04N 5/23212

See application file for complete search history.

(56) References Cited

U.S. PATENT DOCUMENTS

| | | | | |
|---|---|---|---|---|
| 9,292,735 | B2* | 3/2016 | Nagaoka | H04N 5/33 |
| 9,299,006 | B2* | 3/2016 | Shinzaki | G06F 21/32 |
| 9,940,532 | B2* | 4/2018 | Fan | G06K 9/00221 |
| 10,228,246 | B2* | 3/2019 | Winter | G01C 15/00 |
| 10,621,454 | B2* | 4/2020 | Fan | G06K 9/00288 |
| 2007/0292044 | A1* | 12/2007 | Sloge | G06K 9/00127 |
| | | | | 382/274 |
| 2009/0036783 | A1* | 2/2009 | Kishima | G06K 9/2018 |
| | | | | 600/476 |
| 2009/0232367 | A1* | 9/2009 | Shinzaki | G06K 9/0012 |
| | | | | 382/124 |
| 2010/0049049 | A1* | 2/2010 | Asao | A61B 5/0073 |
| | | | | 600/443 |
| 2010/0303310 | A1* | 12/2010 | Chiu | G06K 9/0008 |
| | | | | 382/124 |
| 2011/0142349 | A1* | 6/2011 | Saijo | G06K 9/00355 |
| | | | | 382/195 |
| 2012/0093397 | A1* | 4/2012 | Wang | G06K 9/6257 |
| | | | | 382/159 |
| 2013/0271763 | A1* | 10/2013 | Li | G01N 21/8806 |
| | | | | 356/365 |
| 2014/0036104 | A1* | 2/2014 | Nonaka | H04N 5/23219 |
| | | | | 348/222.1 |
| 2014/0153777 | A1* | 6/2014 | Nagaoka | G06K 9/00369 |
| | | | | 382/103 |
| 2014/0160248 | A1* | 6/2014 | Pomerantz | G06F 3/011 |
| | | | | 348/47 |
| 2014/0160250 | A1* | 6/2014 | Pomerantz | H04N 5/2252 |
| | | | | 348/47 |
| 2014/0169650 | A1* | 6/2014 | Sakimoto | A61B 6/03 |
| | | | | 382/131 |
| 2015/0036893 | A1* | 2/2015 | Shinzaki | H04L 9/3231 |
| | | | | 382/115 |
| 2015/0228093 | A1 | 8/2015 | Miyasa et al. | |
| 2016/0071275 | A1 | 3/2016 | Hirvonen | |
| 2016/0117544 | A1 | 4/2016 | Hoyos et al. | |
| 2016/0142629 | A1* | 5/2016 | Jung | H04N 5/23229 |
| | | | | 348/218.1 |
| 2016/0169671 | A1* | 6/2016 | Winter | G01C 15/00 |
| | | | | 73/1.75 |
| 2017/0053174 | A1* | 2/2017 | Fan | G06K 9/00899 |
| 2017/0061251 | A1* | 3/2017 | Fan | G06K 9/6256 |
| 2017/0193287 | A1* | 7/2017 | Li | G06K 9/00302 |
| 2017/0323155 | A1* | 11/2017 | Biswas | G06K 9/00362 |
| 2017/0323415 | A1* | 11/2017 | Kimoto | G06F 16/33 |
| 2017/0345146 | A1* | 11/2017 | Fan | G06K 9/00228 |
| 2018/0084226 | A1* | 3/2018 | Prasad | H04N 13/161 |
| 2018/0173979 | A1* | 6/2018 | Fan | G06K 9/00255 |
| 2018/0192883 | A1* | 7/2018 | Asao | A61B 5/0073 |
| 2018/0197726 | A1* | 7/2018 | Yamaguchi | G06K 9/4652 |
| 2018/0232865 | A1* | 8/2018 | Chiba | G06T 7/90 |
| 2019/0005700 | A1* | 1/2019 | Liu | G06T 13/80 |
| 2019/0045170 | A1* | 2/2019 | Sugie | H04N 13/239 |

FOREIGN PATENT DOCUMENTS

| | | |
|---|---|---|
| CN | 104077563 A | 10/2014 |
| CN | 105224924 A | 1/2016 |
| CN | 104143078 B | 8/2016 |
| CN | 105930710 A | 9/2016 |
| KR | 20040078198 A | 9/2004 |
| RU | 2358315 C1 | 6/2009 |

OTHER PUBLICATIONS

Kim S, et al: "Face liveness detection using variable focusing", 2013 International Conference on Biometrics (ICB), IEEE, Jun. 4, 2013, pp. 1-6. abstract; figures 2-6; table 1; section 2.2, 3, 4.1.

Extended European search report issued in corresponding European application No. 18178340.8 dated Nov. 27, 2018.

International search report issued in corresponding international application No. PCT/CN2018/091074 dated Sep. 20, 2018.

English translation of the Notice of allowance issued in corresponding RU Application No. 2019134968/07 dated Jul. 13, 2020.

English translation of the Office Action issued in corresponding RU Application No. 2019134968/07 dated Jun. 1, 2020.

Examination Report No. 1 issued in corresponding AU Application No. 2018301994 dated Jun. 4, 2020.

Examination Report No. 2 issued in corresponding AU Application No. 2018301994 dated Aug. 7, 2020.

Examination report issued in corresponding IN application No. 201834024994 dated Sep. 17, 2020.

Written Opinion issued in corresponding SG application No. 11201909671T dated Dec. 7, 2020.

* cited by examiner

METHOD OF LIVING BODY DETECTION AND TERMINAL DEVICE

CROSS-REFERENCE TO RELATED APPLICATION(S)

This application claims priority to Chinese Patent Application No. 201710582818.2, filed on Jul. 17, 2017, the content of which is hereby incorporated by reference in its entirety.

TECHNICAL FIELD

The present disclosure relates to the technical field of terminal devices, and more particularly to a method of living body detection and a terminal device.

BACKGROUND

With the increasing popularization of terminal devices (for example, mobile phones, tablet computers, etc.), terminal devices are able to support more and more applications and become more powerful. As terminal devices become more diverse and personalized, they become indispensable electronic products for users' lives.

Currently, iris recognition is increasingly favored by manufacturers of terminal devices. The security of iris recognition is also one of the most important concerns. For security reasons, in general, living body detection on iris will be performed first prior to iris recognition. The problem of how to achieve living body detection needs to be solved.

SUMMARY

Implementations of the disclosure provide a method for living body detection and related products, which can realize living body detection.

According to a first aspect of implementations of the disclosure, a method of living body detection is provided. The method may include the follows.

A first image for a target object is obtained via a camera at a first focal length and a second image for the target object is obtained via the camera at a second focal length. A difference image of the first image and the second image is determined. Determine whether the target object is a living body according to the difference image.

According to a second aspect of implementations of the disclosure, a terminal device is provided. The terminal device includes a camera and an application processor (AP).

The camera is configured to obtain a first image for a target object via a camera at a first focal length and obtain a second image for the target object via the camera at a second focal length. The AP is configured to control to determine a difference image of the first image and the second image. The AP is further configured to determine whether the target object is a living body according to the difference image.

According to a third aspect of implementations of the disclosure, a terminal device is provided. The terminal device includes a camera, an application processor (AP) coupled with the camera, a memory, and one or more programs stored in the memory and configured to be executed by the AP. The programs include instructions being operable to perform the method of the first aspect.

According to a fourth aspect of implementations of the disclosure, a device of living body detection is provided. The device for living body detection includes a shooting unit, a determining unit, and a judging unit. The shooting unit is configured to obtain a first image for a target object via a camera at a first focal length, and to obtain a second image for the target object via the camera at a second focal length, where the first focal length is different from the second focal length. The determining unit is configured to determine a difference image of the first image and the second image. The judging unit is configured to determine whether the target object is a living body according to the difference image.

According to a fifth aspect of implementations of the disclosure, a computer readable storage medium is provided. The computer readable storage medium is configured to store computer programs. The computer programs are operable with a computer to perform part or all of the operations described in the first aspect of the implementations of the present disclosure.

According to a sixth aspect of implementations of the disclosure, a computer program product is provided. The computer program product includes a non-transitory computer readable storage medium storing computer programs. The computer programs are operable with a computer to perform part or all of the operations described in the first aspect of the implementations of the present disclosure. The computer program product can be a software installation package.

BRIEF DESCRIPTION OF THE DRAWINGS

To illustrate technical solutions embodied by the implementations of the present disclosure or by the related art more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1A:
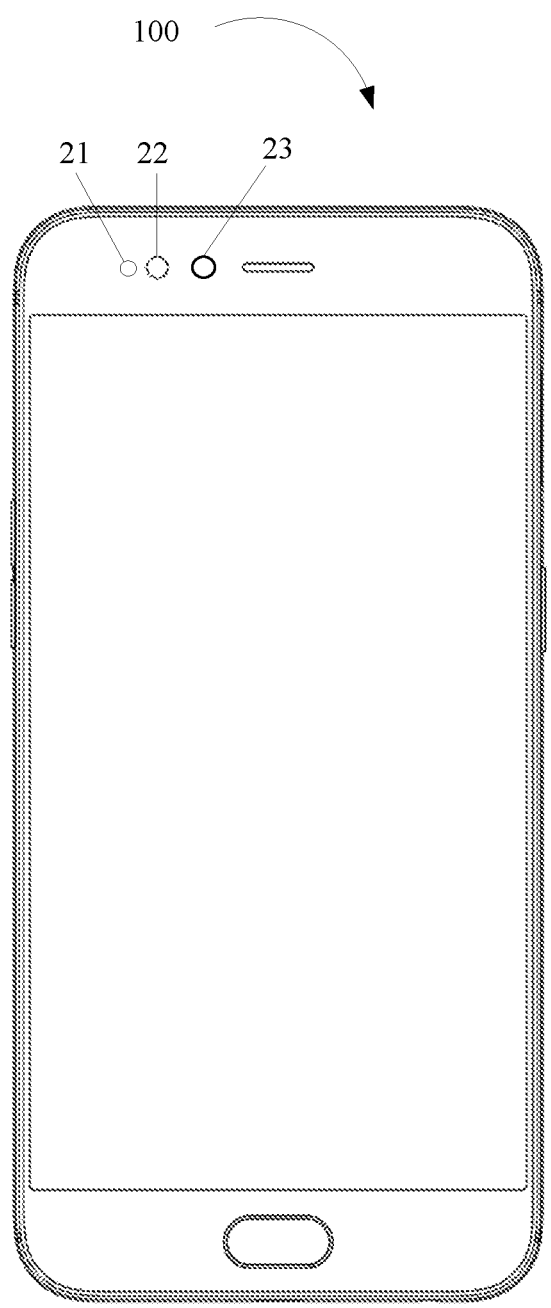
FIG. 1A is a schematic structural diagram illustrating a smart phone according to an implementation of the present disclosure.

Hereinafter, technical solutions embodied by the implementations of the disclosure will be described in a clear and comprehensive manner in reference to the accompanying drawings intended for the implementations. It is evident that the implementations described herein constitute merely some rather than all of the implementations of the disclosure, and that those of ordinary skill in the art will be able to derive other implementations based on these implementations without making inventive efforts, which all such derived implementations shall all fall in the protection scope of the disclosure.

The terms "first", "second" used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of operations or units is not limited to the listed operations or units, it can optionally include other operations or units that are not listed; alternatively, other operations or units inherent to the process, method, product, or device can be included either.

The term "embodiment" or "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

"Terminal device" in the implementations of the disclosure may include various handheld devices with wireless communication functions, on-board devices, wearable devices, computing devices, or other processing devices connected to a wireless modem, as well as various forms of user equipment (UE), mobile stations (Mobile Station, MS), terminal device, etc. For convenience of description, the above-mentioned devices are collectively referred to as terminal devices.

A method of living body detection is provided, in which a first image for a target object is obtained via a camera at a first focal length and a second image for the target object is obtained via the camera at a second focal length, where the first focal length is different from the second focal length, then a difference image of the first image and the second image is determined, thereafter, whether the target object is a living body is determined according to the difference image.

In one implementation, whether the target object is a living body can be determined according to the difference image as follows. An image enhancement process is performed on the difference image. A Binarization process is performed on the difference image subjected to the image enhancement process. Whether the target object is a living body is determined according to the difference image subjected to the binarization process. Under the binarization of the image, the gray value of pixels of the image will be set to 0 or 255, which means that the entire image will present a black and white visual effect.

In another implementation, whether the target object is a living body can be determined according to the difference image as follows. A histogram of the difference image is acquired. The histogram is converted into a curve diagram. A similarity between the curve diagram and a preset curve diagram is determined and whether the target object is a living body is determined according to the similarity.

In one implementation of the present disclosure, whether the target object is a living body can be determined according to the difference image as follows. One or more features are obtained from the difference image, and whether the target object is a living body is determined according to the one or more features.

The preset classifier configured for living body is set as follows. A positive sample set and a negative sample set are acquired, where the positive sample set containing a plurality of difference images for a plurality of living bodies and the negative sample set containing a plurality of difference images for a plurality of non-living bodies. A plurality of features is extracted from the positive sample set and a plurality of features are extracted from the negative sample set. Obtain a first target classifier according to the plurality of features extracted from the positive sample set and obtain a second target classifier according to the plurality of features extracted from the negative sample set. The first target classifier and the second target classifier are used as the preset classifier.

In one implementation, the difference image of the first image and the second image can be determined as follows. Obtain a binarized first image by performing a binarization process on the first image. Obtain a binarized second image by performing a binarization process on the second image. The difference image is obtained by calculating an absolute value of a difference between each pixel of the binarized first image and each corresponding pixel of the binarized second image.

In another implementation, the difference image of the first image and the second image can be determined as follows. A first target image corresponding to the target object is extracted from the first image. A second target image corresponding to the target object is extracted from the second image. An image resolution of the first target image is adjusted to be consistent with that of the second target image. A difference image of the first target image adjusted and the second target image is determined as the difference image of the first image and the second image.

Another method for living body detection is provided, in which a first image for a target object is obtained via a camera at a first focal length and a second image for the target object is obtained via the camera at a second focal length, where the first focal length is different from the second focal length. A difference image of the first image and the second image is then determined and subjected to at least one of an enhancement process and a binarization process. Then whether the target object is a living body is determined according to the difference image subjected to the enhancement process and/or the binarization process. For details of this method, reference is made to the method identified above.

A terminal device including a camera and an application processor (AP) is provided. The camera is coupled with the AP and configured to obtain a first image for a target object via a camera at a first focal length and obtain a second image for the target object via the camera at a second focal length, wherein the first focal length is different from the second focal length. The AP is configured to determine a difference image of the first image and the second image and determine whether the target object is a living body according to the difference image. Alternatively, the AP is configured to the AP is configured to determine a difference image of the first image and the second image and then perform at least one of an enhancement process and a binarization process on the difference image, after that, whether the target object is a living body is determined according to the difference image subjected to the enhancement process and/or the binarization process.

Implementations of the present disclosure will be described in detail below. As illustrated in FIG. 1A, a terminal device 100 such as a smart phone including an iris recognition device is provided. The iris recognition device includes an infrared fill light 21 and an infrared camera 22. During operation of the iris recognition device, light of the infrared fill light 21 is directed to an iris and then reflected by the iris to the infrared camera 22. The iris recognition device is configured to collect iris images. The terminal device 100 may still have a front camera 23. The front camera can be implemented with a zoom camera.

Figures 1B, 2:
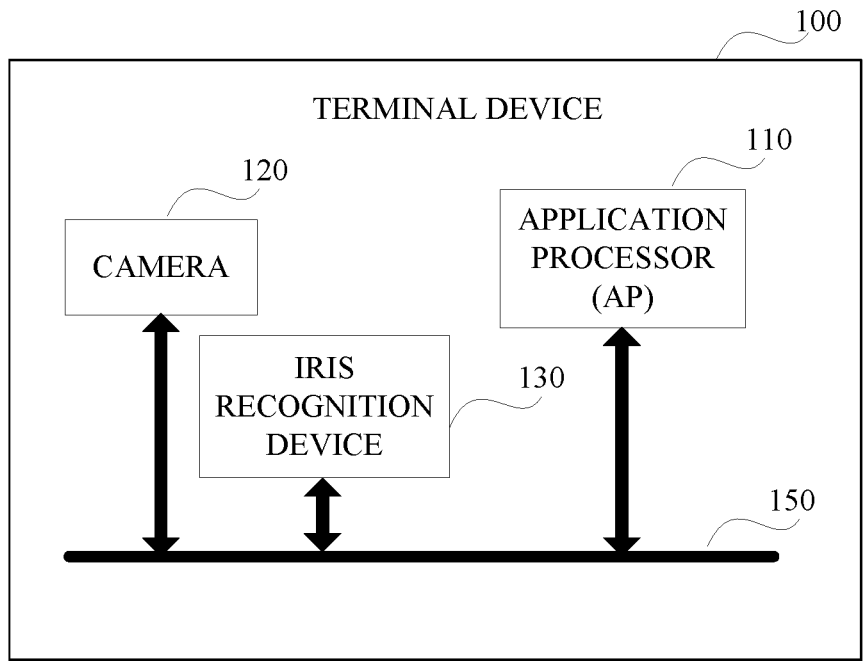
FIG. 1B is a schematic structural diagram illustrating a terminal device according to an implementation of the present disclosure.
FIG. 2 is a schematic flow diagram illustrating a method of living body detection according to an implementation of the present disclosure.

FIG. 1B is a schematic structural diagram illustrating a terminal device 100 according to an implementation of the present disclosure. Referring to FIG. 1B, the terminal device 100 includes an application processor (AP) 110, a camera 120, and an iris recognition device 130. The iris recognition device 130 can be integrated with the camera 120; alternatively, the iris recognition device 130 can be separated from the camera 120. The AP 110 is coupled with the camera 120 and the iris recognition device 130 via a bus 150.

In some possible implementations, the camera 120 is configured to obtain a first image for a target object via a camera at a first focal length, and to obtain a second image for the target object via the camera at a second focal length, where the first focal length is different from the second focal length.

The AP 110 is configured to be controlled to determine a difference image of the first image and the second image. The AP 110 is further configured to determine whether the target object is a living body according to the difference image.

In some possible implementations, in terms of determining whether the target object is a living body according to the difference image, the AP 110 is configured to acquire a histogram of the difference image, convert the histogram into a curve diagram, determine a similarity between the curve diagram and a preset curve diagram, and determine whether the target object is a living body according to the similarity.

In some possible implementations, in terms of determining whether the target object is a living body according to the difference image, the AP 110 is configured to obtain one or more features from the difference image, and determine whether the target object is a living body according to the one or more features.

In some possible implementations, in terms of determining the difference image of the first image and the second image, the AP 110 is configured to obtain a binarized first image by performing a binarization process on the first image, obtain a binarized second image by performing a binarization process on the second image, and obtain the difference image by calculating an absolute value of a difference between each pixel of the binarized first image and each corresponding pixel of the binarized second image.

In some possible implementations, in terms of determining the difference image of the first image and the second image, the AP 110 is configured to extract, from the first image, a first target image corresponding to the target object and extract, from the second image, a second target image corresponding to the target object, adjust an image resolution of the first target image to be consistent with that of the second target image, and determine a difference image of the adjusted first target image and the second target image.

FIG. 2 is a schematic flow diagram illustrating a method for living body detection according to an implementation of the present disclosure. The method is applicable to a terminal device equipped with a camera and an application processor (AP), for example, the terminal device can be the one illustrated in FIG. 1A or FIG. 1B. Referring to FIG. 2, the method for living body detection begins at block 201.

At block 201, a first image for a target object is obtained via a camera at a first focal length and a second image for the target object is obtained via the camera at a second focal length, where the first focal length is different from the second focal length.

The camera may be a zoom camera. The target object may be a human face, an iris, or other objects shot by the camera. The first image and the second image are obtained based on different focal lengths, that is to say, the first focal length and the second focal length are different. Further, the first image and the second image may correspond to the same scene.

At block 202, a difference image of the first image and the second image is determined.

The first image may have a same resolution as that of the second image. Both of the first image and the second image may be grayscale images. In general, a grayscale image will contain main outline information of an image and therefore, it is not necessary to take color information of the image into consideration, which will reduce the complexity of image processing.

The difference image can be obtained in different manners including but not limited to a binarization process and image resolution adjustment, which will be detailed below.

The binarization process can be performed respectively on the first image and the second image, with the purpose of reducing the complexity of two-dimensional images and achieving rapid process. Based on this, in one implementation, at block 202, the difference image of the first image and the second image can be determined as follows. The binarization process is performed on the first image to obtain a binarized first image. The binarization process is performed on the second image to obtain a binarized second image. An absolute value of a difference between each pixel of the binarized first image and each corresponding pixel of the binarized second image is calculated to obtain the difference image.

For the binarized first image and the binarized second image, the difference image can be obtained by calculating the absolute value of the difference between each pixel of the binarized first image and each corresponding pixel of the binarized second image. In this way, it is possible to analyze whether the target object is a living body according to the difference image.

It should be noted that the binarization process performed on the first image and the second image is not sequentially limited. For example, the binarization process can be performed on the second image first and then performed on the first image and vice versa, or can be performed on both of the first image and the second image simultaneously.

In another implementation, at block 202, the difference image of the first image and the second image can be determined as follows. A first target image corresponding to the target object is extracted from the first image. A second target image corresponding to the target object is extracted from the second image. An image resolution of the first target image is adjusted to be consistent with that of the second target image. A difference image of the adjusted first target image and the second target image is determined as the difference image of the first image and the second image.

The first target image can be an iris image or a detailed iris image. Similarly, the second target image may be an iris image or a detailed iris image. A scheme used herein for extracting the first target image or the second target image may include but is not limited to Harris corner detection algorithm, wavelet transform algorithm, scale invariant feature transform (SIFT) algorithm, and the like. Since there may be a difference in resolutions of the first image and the second image and the difference may be increased after the features are extracted, the resolution of the first target image can be adjusted to be consistent with that of the second target image. The manner in which the resolution is adjusted can be an interpolation operation (for example, a linear interpolation operation, a bilinear interpolation operation, etc.) or down-sampling processing, or the like. In this way, the difference image of the first target image and the second target image can be obtained through further calculating.

The above mentioned binarization process and image resolution adjustment can be adopted in combination. For instance, for the purpose of reducing the complexity of two-dimensional (2D) images and achieving rapid process, after the first target image and the second target image are obtained, binarization process can be performed on the first target image and the second target image, so as to obtain the binarized first target image and the binarized second target image. The absolute value of the difference between each pixel of the binarized first target image and each corresponding pixel of the binarized second target image can be calculated to obtain the difference image. In this way, it is possible to analyze whether the target object is a living body according to the difference image.

At block 203, determine whether the target object is a living body according to the difference image.

The difference image may include more detailed features which can be understood as differentiation characteristics. For the same object, images shot at different focal lengths are different, and the images may contain different detailed information as well. In the implementations of the present disclosure, for ease of explanation, planar images (such as a photograph) and stereo images (such as an iris or a human face) are described. Images obtained at different focal lengths have differentiation characteristics, and the difference image can be used to determine changes between images and indicate a living feature property of the target object. Differentiation characteristics of photographs shot at different focal lengths are different from that of an iris shot at different focal lengths. Such difference is mainly due to the following factors. (1). Different spatial scope; for example, a photograph corresponds to a two-dimensional space while an iris corresponds to a three-dimensional space. (2). Different reflection range. (3). Different biological characteristics; for example, a photograph has no biological characteristics while an iris has biological characteristics. Therefore, it is possible to determine, according to characteristics of the difference image, whether the target object is a living body.

With further treatment such as histogram-curve diagram conversion and feature extraction on the difference image, whether the target object is a living body can be determined, that is, judged. The forging treatment will be illustrated below separately.

In one possible implementation, at block 203, whether the target object is a living body can be determined according to the difference image as follows. A histogram of the difference image is acquired. The histogram is converted into a curve diagram. Similarity between the curve diagram and a preset curve diagram is determined, and whether the target object is a living body is determined according to the similarity.

The above preset curve diagram can be pre-stored in the terminal device and can be experimentally obtained through a difference image corresponding to an iris living body. The histogram of the difference image can be obtained and then fitted into the curve diagram, that is, the vertex of each block of the histogram can be obtained and then fitted to obtain the curve diagram. The fitting referred to herein can be a linear fitting, a Gaussian fitting, a parabolic fitting, and the like. Then the similarity between the curve diagram and the preset curve diagram is calculated to obtain a similarity value. When the similarity value is greater than a similarity threshold, it can be considered that the target object is from a living body. On the other hand, when the similarity value is less than or equal to the similarity threshold, it can be considered that the target object is not from a living body, that is, the target object is from a non-living body. In this way, it is possible to recognize whether the target object is from a living body with aid of the histogram of the difference image. The above similarity threshold may be an empirical value, or may be set by default by a system, or may be set by a user, the present disclosure is not limited thereto.

The above implementations of the present disclosure can be used to distinguish between a living body and a photograph. For instance, the living body is a real human body, it corresponds to a three-dimensional (3D) image and the surface thereof is uneven. In contrast, the photograph is a planar image and has a flat surface. Therefore, by shooting a living body and a photograph at different focal lengths, there will be significant differences between a histogram of a difference image obtained based on the living body and a histogram of a difference image obtained based on the photograph. According to the teaching of such principle, with aid of the above method, it is possible to determine whether the target object is a living body.

In another possible implementation, at block 203, whether the target object is a living body can be determined according to the difference image as follows. First, one or more features can be obtained from the difference image, and then whether the target object is a living body can be determined according to the one or more features.

Specifically, a positive sample set and a negative sample set can be acquired, where the positive sample set containing a plurality of difference images for a plurality of living bodies and the negative sample set containing a plurality of difference images for a plurality of non-living bodies. A plurality of features is extracted from the positive sample set and a plurality of features are extracted from the negative sample set. Thereafter, a first classifier can be obtained according to the plurality of features extracted from the positive sample set and a second classifier can be obtained according to the plurality of features extracted from the negative sample set. At last, whether the target object is a living body can be determined according to the one or more features, the first classifier, and the second classifier.

As an example, a positive sample set is acquired, and the positive sample set contains difference images of A living bodies, where A is a positive integer; similarly, a negative sample set is acquired, and the negative sample set contains difference images of B non-living bodies, where B is a positive integer. Features of the positive sample set are extracted to obtain features of set A, and features of the negative sample set are extracted to obtain features of set B. After this, a first classifier can be obtained according to the features of set A, and a second classifier can be obtained according to the features of set B. At last, the first classifier and the second classifier, and the one or more features can be used for living body detection.

The difference images referred to in operations at C1 and C2 can be obtained via the operations described at block 201 to 202. The values of A and B can be set by the user, the positive sample set includes A positive samples, and the negative sample includes B negative samples. The greater the value of A and/or B, the better the classification effect of the classifier. For the manner in which features are extracted at C3 and C4, reference may be made to the above description. In addition, the classifier includes but not limited to support vector machines, genetic algorithm classifiers, neural network algorithm classifiers, cascade classifiers (e.g., genetic algorithm+SVM), and the like.

As can be seen, the methods of the implementations of the present disclosure are applicable to the terminal device including the camera and the AP. By means of zoom shooting, the first image for the target object is obtained via the camera at the first focal length and the second image for the target object is obtained via the camera at the second focal length, where the first focal length is different from the second focal length. Then the difference image of the first image and the second image is determined. Thereafter, whether the target object is a living body can be determined according to the difference image. Thus, it is possible to realize zoom shooting on the target object to obtain two images shot at different focal lengths, and then whether the target object is a living body can be determined according to the difference between the two images. In this way, living body detection can be realized.

Figure 3:
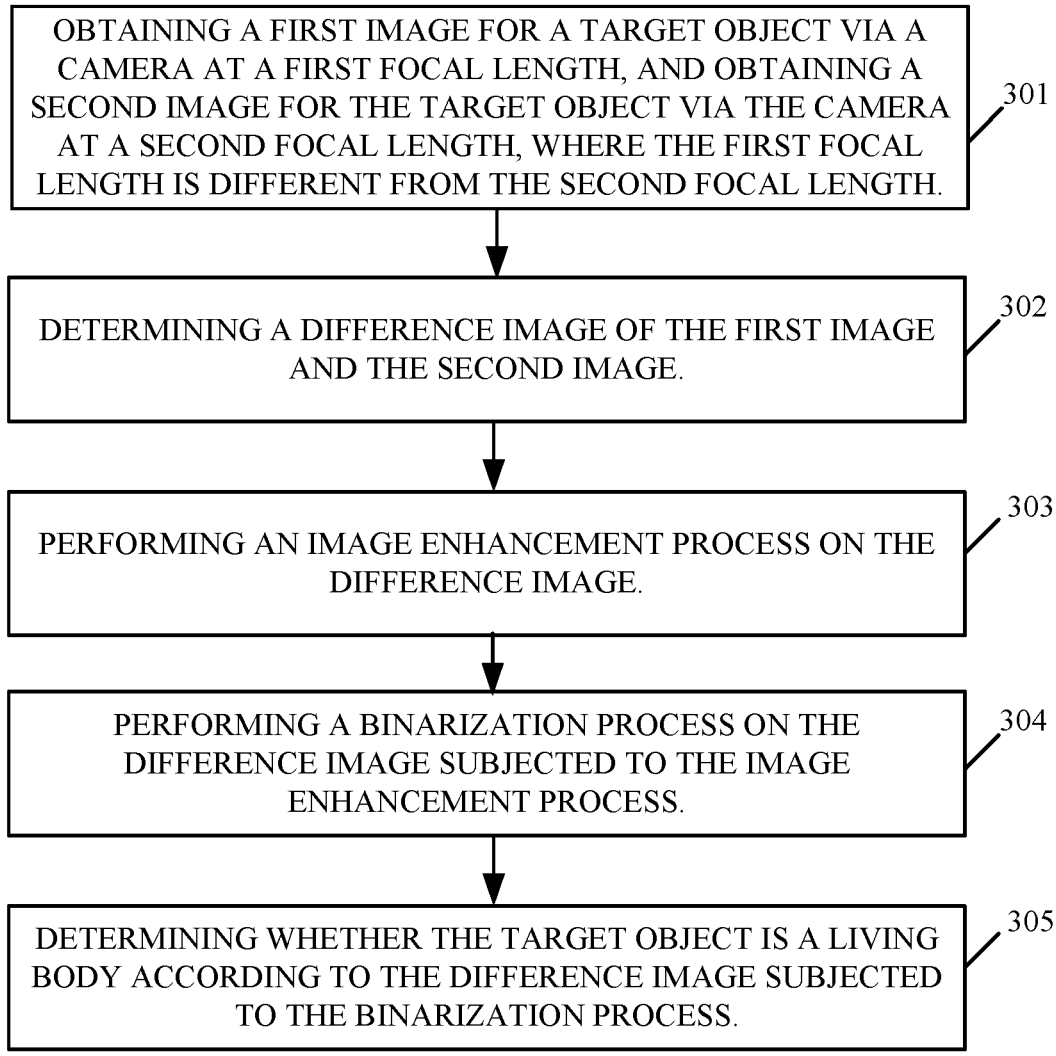
FIG. 3 is a schematic flow diagram illustrating another method of living body detection according to an implementation of the present disclosure.

FIG. 3 is a schematic flow diagram illustrating a method of living body detection according to an implementation of the present disclosure. The method is applicable to a terminal device with a camera and an application processor (AP). The terminal device can be the terminal device illustrated in FIG. 1A or FIG. 1B. Referring to FIG. 3, the method for living body detection begins at block 301.

At block 301, a first image for a target object is obtained via a camera at a first focal length and a second image for the target object is obtained via the camera at a second focal length, where the first focal length is different from the second focal length.

At block 302, a difference image of the first image and the second image is determined.

At block 303, an image enhancement process is performed on the difference image.

The above image enhancement process may include but is not limited to histogram equalization, grayscale stretching, wavelet de-noising, image restoration, image sharpening processing, smoothing processing, median filtering, two-sided filtering, guiding filtering, and other image processes.

Image quality of the difference image can be improved after the image enhancement process is completed. Specifically, detailed information of the image is enhanced, that is, previously insignificant detailed information can be displayed after performing the image enhancement process.

At block 304, a binarization process is performed on the difference image subjected to image enhancement.

By performing the binarization process on the difference image subjected to image enhancement, the complexity of the difference image subjected to image enchantment can be reduced, which is convenient for subsequent operations. During the binarization process, a binarization threshold can be selected. For example, a pixel value of a pixel point greater than the binarization threshold can be set to 255. A pixel value of a pixel point less than or equal to the binarization threshold can be set to 0. The binarization threshold may be an average brightness value of a difference image subjected to image enhancement process.

At block 305, whether the target object is a living body is determined according to the difference image subjected to the binarization process.

For the manner in which whether the target object is a living body is determined according to the binarized difference image, reference is made to corresponding operations described in FIG. 2 and will not be detailed here again.

As can be seen, in the implementations of the disclosure, the target object is shot through the camera at the first focal length to obtain the first image and shot through the camera at the second focal length to obtain the second image, where the first focal length is different from the second focal length. Thereafter, the difference image of the first image and the second image is determined and the image enhancement process is performed on the difference image. The binarization process is performed on the difference image after the image enhancement process. Finally, whether the target object is a living body is determined according to the binarized difference image. Thus, it is possible to realize zoom shooting on the target object to obtain two images shot at different focal lengths, and further determine whether the target object is a living body according to differences between the two images. In this way, living body detection can be realized.

Figure 4:
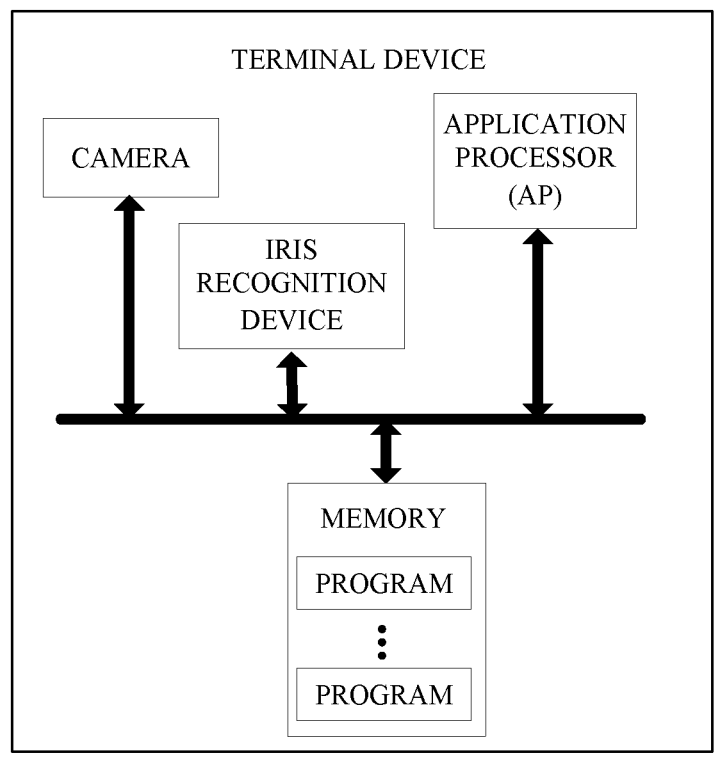
FIG. 4 is a schematic structural diagram illustrating another terminal device according to an implementation of the present disclosure.

FIG. 4 is a schematic structural diagram illustrating a terminal device according to an implementation of the present disclosure. Referring to FIG. 4, the terminal device includes a camera, an application processor (AP), and a memory including one or more programs. The terminal device may further include an iris recognition device.

The one or more programs are stored in the memory and configured to be executed by the AP. The programs include instructions being operable to perform the following operations. A first image for a target object is obtained via a camera at a first focal length and a second image for the target object is obtained via the camera at a second focal length, where the first focal length is different from the second focal length. A difference image of the first image and the second image is determined. Whether the target object is a living body is determined according to the difference image.

In a possible implementation, in terms of determining whether the target object is a living body according to the difference image, the programs include instructions being operable to perform the following operations. A histogram of the difference image is acquired. The histogram is converted into a curve diagram. A similarity between the curve diagram and a preset curve diagram is determined, and whether the target object is a living body is determined according to the similarity.

In another possible implementation, in terms of determining whether the target object is a living body according to the difference image, the programs include instructions being operable to perform the following operations. One or more features are obtained from the difference image, and whether the target object is a living body can be determined according to the one or more features.

In a possible implementation, in terms of determining the difference image of the first image and the second image, the programs include instructions being operable to perform the following operations. A binarization process is performed on the first image to obtain a binarized first image. A binarization process is performed on the second image to obtain a binarized second image. An absolute value of a difference between each pixel of the binarized first image and each corresponding pixel of the binarized second image is calculated to obtain the difference image.

In another possible implementation, in terms of determining the difference image of the first image and the second image, the programs include instructions being operable to perform the following operations. A first target image corresponding to the target object is extracted from the first image. A second target image corresponding to the target object is extracted from the second image. An image resolution of the first target image is adjusted to be consistent with that of the second target image. A difference image of the adjusted first target image and the second target image is determined.

Figure 5A:
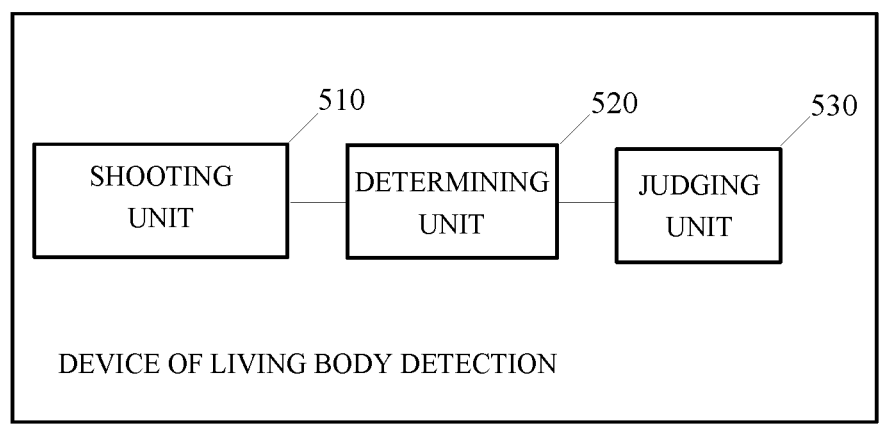
FIG. 5A is a schematic structural diagram illustrating a device of living body detection according to an implementation of the present disclosure.

FIG. 5A is a schematic structural diagram illustrating a device of living body detection according to an implementation of the present disclosure. The device for living body detection is applicable to a terminal device including a camera and an application processor (AP). Referring to FIG. 5A, the device of living body detection includes a shooting unit 510, a determining unit 520, and a judging unit 530.

The shooting unit 510 is configured to obtain a first image for a target object via a camera at a first focal length and obtain a second image for the target object via the camera at a second focal length, and focal lengths corresponding to the first image and the second image are different. The determining unit 520 is configured to determine a difference image of the first image and the second image. The judging unit 530 is configured to determine whether the target object is a living body according to the difference image.

Figure 5B:
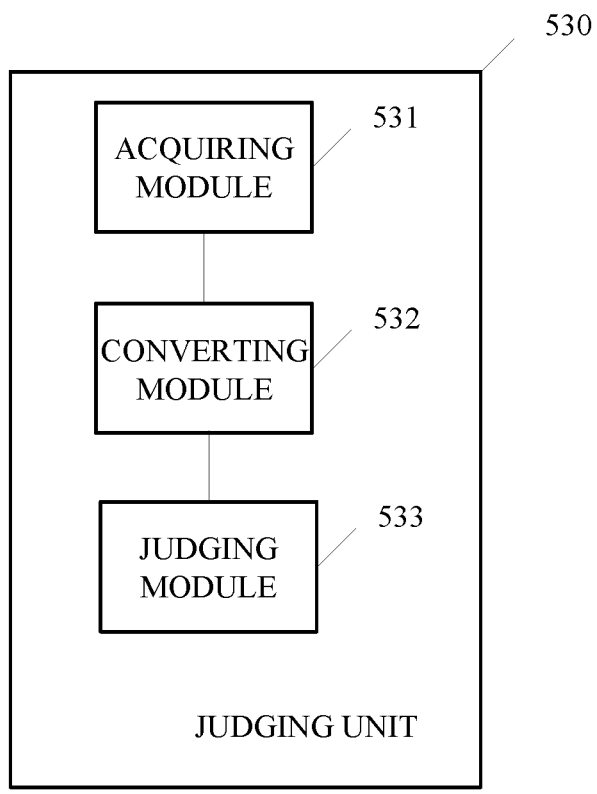
FIG. 5B is a schematic structural diagram illustrating a judging unit of a device of living body detection described in FIG. 5A according to an implementation of the present disclosure.

In one implementation, FIG. 5B is a detailed schematic structural diagram illustrating the judging unit 530 of the device of living body detection described in FIG. 5A. As illustrated in FIG. 5B, the judging unit 530 may include an acquiring module 531, a converting module 532, and a judging module 533.

The acquiring module 531 is configured to acquire a histogram of the difference image. The converting module 532 is configured to convert the histogram into a curve diagram. The judging module 533 is configured to determine a similarity between the curve diagram and a preset curve diagram, and determine whether the target object is a living body according to the similarity.

Figure 5C:
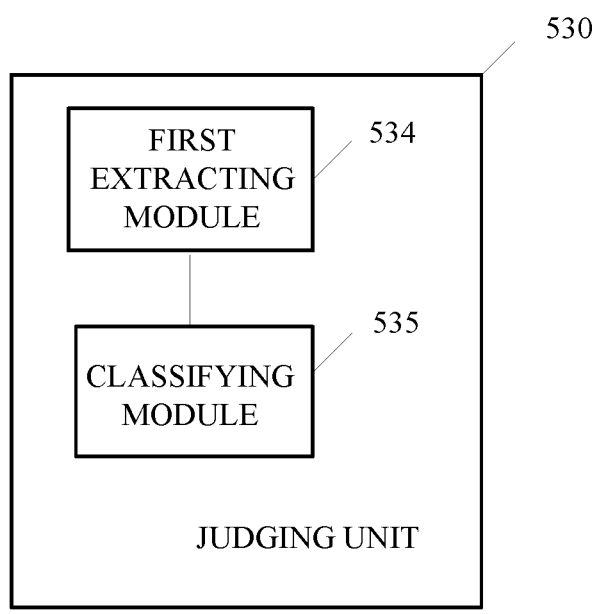
FIG. 5C is another schematic structural diagram illustrating the judging unit of the device of living body detection described in FIG. 5A according to an implementation of the present disclosure.

In one implementation, FIG. 5C is a detailed schematic structural diagram illustrating the judging unit 530 of the device for living body detection described in FIG. 5A. As illustrated in FIG. 5C, the judging unit 530 may include a first extracting module 534 and a classifying module 535.

The first extracting module 534 is configured to extract features of the difference image to obtain a feature parameter set. The classifying module 535 is configured to train the feature parameter set through a preset classifier configured for living body detection to obtain a training result, and determine whether the target object is a living body according to the training result.

Figure 5D:
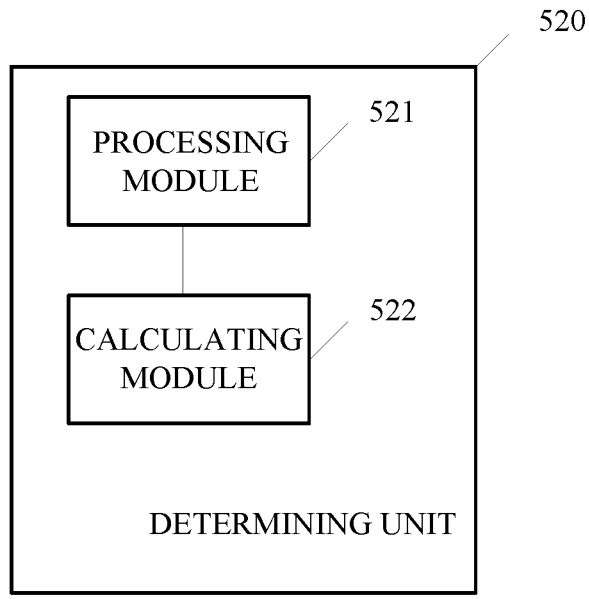
FIG. 5D is a schematic structural diagram illustrating a determining unit of a device of living body detection described in FIG. 5A according to an implementation of the present disclosure.

In one implementation, FIG. 5D is a detailed schematic structural diagram illustrating the determining unit 520 of the device of living body detection described in FIG. 5A. As illustrated in FIG. 5D, the determining unit 520 may include a processing module 521 and a calculating module 522.

The processing module 521 is configured to obtain a binarized first image by performing a binarization process on the first image. The processing module 521 is further configured to obtain a binarized second image by performing a binarization process on the second image. The calculating module 522 is configured to obtain the difference image by calculating an absolute value of a difference between each pixel of the binarized first image and each corresponding pixel of the binarized second image.

Figure 5E:
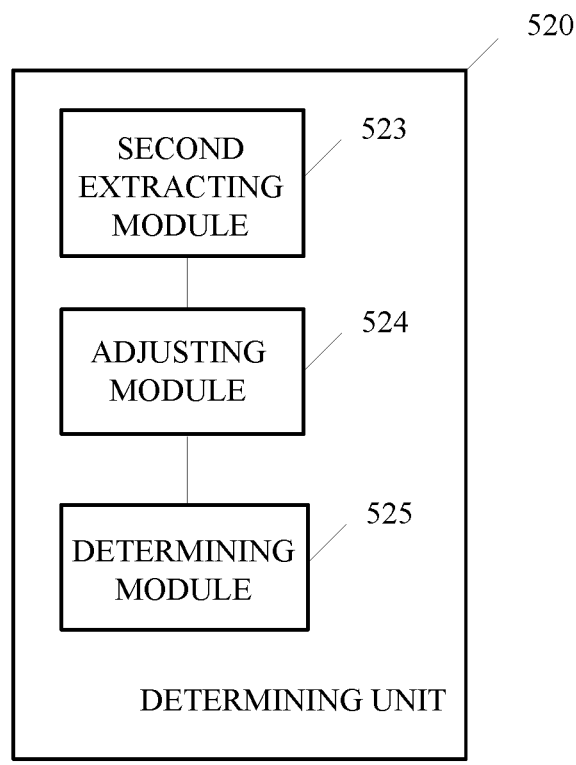
FIG. 5E is another schematic structural diagram illustrating the determining unit of the device of living body detection described in FIG. 5A according to an implementation of the present disclosure.

In one implementation, FIG. 5E is a detailed schematic structural diagram illustrating the determining unit 520 of the device of living body detection described in FIG. 5A. As illustrated in FIG. 5E, the determining unit 520 may include a second extracting module 523, an adjusting module 524, and a determining module 525.

The second extracting module 523 is configured to extract, from the first image, a first target image corresponding to the target object. The second extracting module 523 is further configured to extract, from the second image, a second target image corresponding to the target object. The adjusting module 524 is configured to adjust an image resolution of the first target image to be consistent with that of the second target image. The determining module 525 is configured to determine a difference image of the adjusted first target image and the second target image.

As can be seen, by means of the device of living body detection according to the implementations of the disclosure, the first image for a target object is obtained via the camera at the first focal length, and the second image for the target object is obtained via the camera at the second focal length, where the first focal length is different from the second focal length. Then the difference image of the first image and the second image is determined. Thereafter, whether the target object is a living body is determined according to the difference image. Thus, it is possible to realize zoom shooting on the target object to obtain two images shot at different focal lengths, and then whether the target object is a living body can be determined according to the difference between the two images. In this way, living body detection can be realized.

It should be understood that functions of units or modules of the device for living body detection in this implementation can be implemented according to the methods in the foregoing method implementations. For details, reference may be made to the related descriptions in the foregoing method implementations, and it will not be described in further detail herein.

Figure 6:
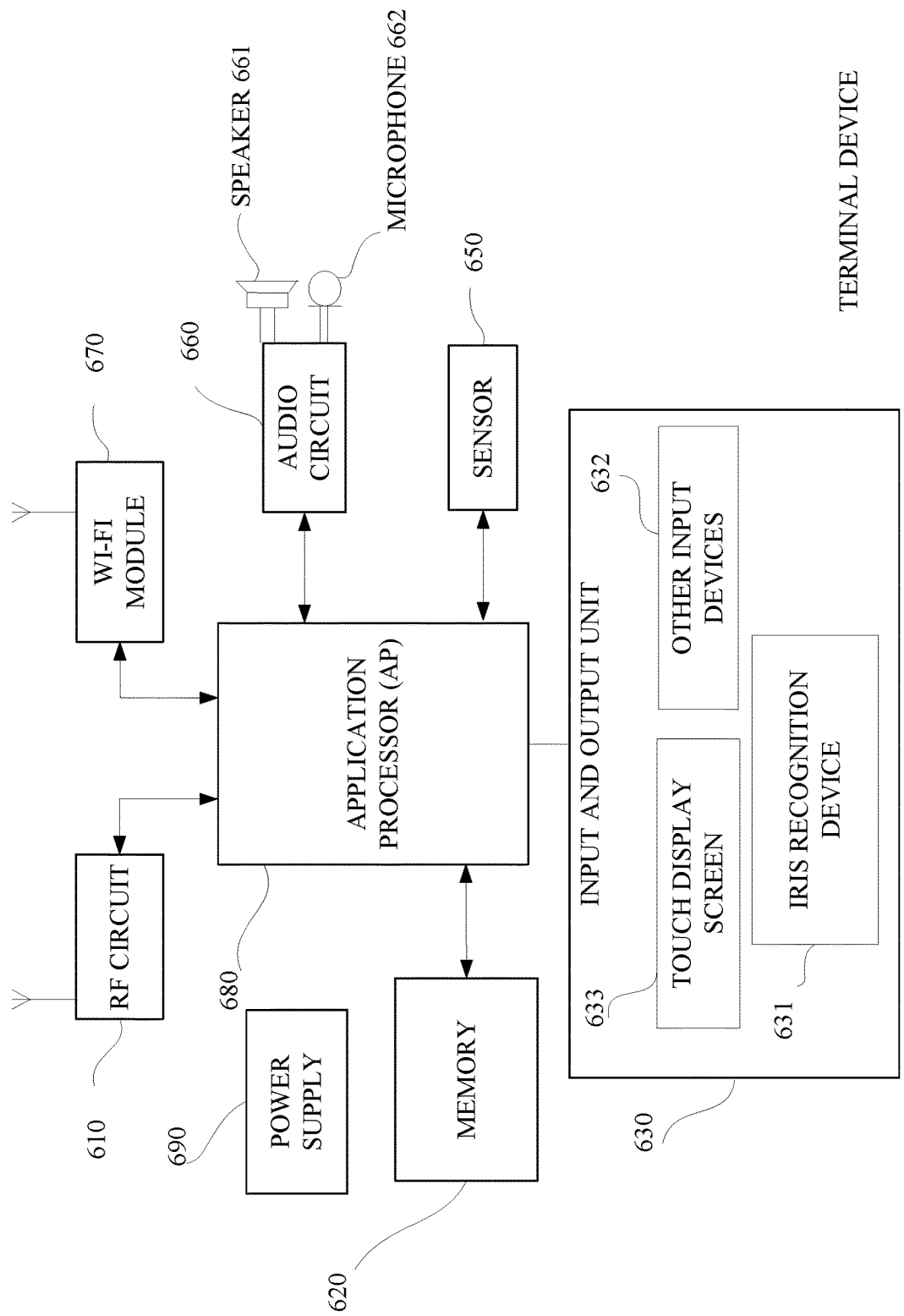
FIG. 6 is a schematic structural diagram illustrating another terminal device according to an implementation of the present disclosure.

According to an implementation of the present disclosure, there is provided another terminal. As illustrated in FIG. 6, only parts related to the implementations of the present disclosure are illustrated for ease of description. For technical details not described, reference may be made to the method implementations of the present disclosure. The terminal device may be any mobile terminal, such as a mobile phone, a tablet computer, a personal digital assistant (PDA), a point of sale terminal (POS), an on-board computer, and the like. The following describes the mobile phone as an example of the terminal device.

FIG. 6 is a block diagram illustrating partial structure of a mobile phone related to a terminal device according to an implementation of the present disclosure. As illustrated in FIG. 6, the mobile phone includes a radio frequency (RF) circuit 610, a memory 620, an input unit 630, a sensor 650, an audio circuit 660, a wireless fidelity (Wi-Fi) module 670, an application processor (AP) 680, a power supply 690, and other components. Those skilled in the art can understand that the structure of the mobile phone illustrated in FIG. 6 does not constitute any limitation. The mobile phone configured to implement technical solutions of the disclosure may include more or fewer components than illustrated, or may combine certain components or different components.

In the following, various components of the mobile phone will be described in detail with reference to FIG. 6.

The input unit 630 is configured to receive input digital or character information and generate key signal input associated with user setting and function control of the mobile phone. In one implementation, the input unit 630 may include a touch display screen 633, an iris recognition device 631. The input unit 630 may further include other input devices 632. In at least one implementation, the other input devices 632 may be a camera, for example, a zoom camera. In one implementation, the other input devices 632 may include, but not limited to, one or more of a physical key, a function key (such as a volume control key, a switch key, etc.), a trackball, a mouse, a joystick, and the like.

The AP 80 is configured to perform the following operations.

Zoom shooting is performed on a target object through the camera to obtain a first image and a second image, and focal lengths corresponding to the first image and the second image are different. A difference image of the first image and the second image is determined. Whether the target object is a living body is determined according to the difference image.

The AP 680 is a control center of the mobile phone. It uses various interfaces and lines to connect various parts of the whole mobile phone, runs or executes software programs and/or modules stored in the memory 620, and calls data stored in the memory 620 to perform various functions of the mobile phone and process data, thereby monitoring the mobile phone. In at least one implementation, the AP 680 may include one or more processing units; for example, the AP 680 may be integrated with an application processor and a modem processor, where the application processor is mainly configured to maintain an operating system, a user interface, application programs, and so on, and the modem processor is mainly configured for wireless communication. It will be appreciated that the above-mentioned modem processor may not be integrated into the AP 680.

The memory 620 may include a high-speed random access memory (RAM), and may further include a non-transitory memory such as at least one disk storage device, a flash device, or other non-transitory solid storage devices.

The RF circuit 610 is configured to transmit or receive information. Generally, the RF circuit 610 includes but is not limited to an antenna, at least one amplifier, a transceiver, a coupler, a low noise amplifier (LNA), a duplexer, and the like. In addition, the RF circuit 610 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The mobile phone may also include at least one sensor 650, such as a light sensor, a motion sensor, and other sensors. In one implementation, the light sensor may include an ambient light sensor and a proximity sensor, among which the ambient light sensor may adjust the brightness of the display screen according to ambient lights, and the proximity sensor may turn off the display screen and/or backlight when the mobile phone reaches nearby the ear. As a kind of a motion sensor, an accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 660, a speaker 661, a microphone 662 may be configured to provide audio interfaces between the user and the mobile phone. The audio circuit 660 may be configured to convert the received audio data into electrical signals and transfer the electrical signals to the speaker 661. The speaker 661 is configured to convert the electrical signals into sound signals to output. On the other hand, the microphone 662 is configured to convert the received sound signals into electrical signals, which will be received and converted into audio data by the audio circuit 660 to output. The audio data is then processed and transmitted by the AP 680 via the RF circuit 610 to another mobile phone for example, or, the audio data is output to the memory 620 for further processing.

Wi-Fi belongs to a short-range wireless transmission technology. With aid of the Wi-Fi module 670, the mobile phone may assist the user in E-mail receiving and sending, webpage browsing, access to streaming media, and the like. Wi-Fi provides users with wireless broadband Internet access. Although the Wi-Fi module 670 is illustrated in FIG. 6, it should be understood that the Wi-Fi module 670 is not essential to the mobile phone and can be omitted according to actual needs without departing from the essential nature of the present disclosure.

The mobile phone also includes the power supply 690 (e.g., a battery) that supplies power to various components. For instance, the power supply 690 may be logically connected to the AP 680 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 2 and FIG. 3 can be realized based on the structure of the mobile phone.

The functions of the units illustrated in FIG. 4 and FIG. 5A to 5E can be achieved based on the structure of the mobile phone.

Implementations of the present disclosure also provide a computer readable storage medium. The computer readable storage medium may store computer programs which, when executed, can be operable with a computer to accomplish all or part of the operations of any of method for living body detections described in the above method implementations.

Implementations of the present disclosure also provide a computer program product. The computer program product includes a non-transitory computer readable storage medium storing computer programs. The computer programs are operable with a computer to accomplish all or part of the operations of any of the methods described in the above method implementations.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection via some interfaces, or may be indirect coupling or communication among devices or units, and may be an electrical connection, or other forms of connection.

The units described as separate components may or may not be physically separate, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various implementations of the present disclosure. The memory includes various medium capable of storing program codes, such as a universal serial bus (USB), a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a read-only memory (ROM), a random access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes. Therefore, the scope of the present disclosure should be determined by the scope of the claims.

What is claimed is:

1. A method of living body detection, comprising:
   obtaining a first image for a target object via a camera at a first focal length;
   obtaining a second image for the same target object via the camera at a second focal length, wherein the camera is a zoom camera, and the first focal length is different from the second focal length, wherein the first image has a same resolution as that of the second image;
   determining a difference image of the first image and the second image; and
   determining whether the target object is a living body according to the difference image, wherein the determining whether the target object is the living body according to the difference image comprises:
      obtaining one or more features from the difference image;
      acquiring a positive sample set and a negative sample set, wherein the positive sample set comprises a plurality of difference images for a plurality of living bodies and the negative sample set comprises a plurality of difference images for a plurality of non-living bodies;
      extracting a plurality of features from the positive sample set and a plurality of features from the negative sample set;
      obtaining a first classifier according to the plurality of features extracted from the positive sample set and a second classifier according to the plurality of features extracted from the negative sample set; and
      determining whether the target object is the living body according to the one or more features, the first classifier, and the second classifier.

2. The method of claim 1, wherein the determining the difference image of the first image and the second image comprises:
   obtaining a binarized first image by performing a binarization process on the first image;
   obtaining a binarized second image by performing a binarization process on the second image; and
   obtaining the difference image by calculating an absolute value of a difference between each pixel of the binarized first image and each corresponding pixel of the binarized second image.

3. The method of claim 1, wherein the determining the difference image of the first image and the second image comprises:
   extracting, from the first image, a first target image corresponding to the target object;

extracting, from the second image, a second target image corresponding to the target object;

adjusting an image resolution of the first target image to be consistent with an image resolution of the second target image; and determining a difference image of the adjusted first target image and the second target image.

4. A terminal device, comprising:

a camera; and an application processor (AP), wherein the camera is coupled with the AP and configured to obtain a first image for a target object via a camera at a first focal length and obtain a second image for the same target object via the camera at a second focal length, wherein the camera is a zoom camera, and the first focal length is different from the second focal length, wherein the first image has a same resolution as that of the second image;

the AP is configured to determine a difference image of the first image and the second image and determine whether the target object is a living body according to the difference image; and the AP configured to determine whether the target object is the living body according to the difference image is configured to:

obtain one or more features from the difference image;

acquire a positive sample set and a negative sample set, wherein the positive sample set comprises a plurality of difference images for a plurality of living bodies and the negative sample set comprises a plurality of difference images for a plurality of non-living bodies;

extract a plurality of features from the positive sample set and a plurality of features from the negative sample set;

obtain a first classifier according to the plurality of features extracted from the positive sample set and a second classifier according to the plurality of features extracted from the negative sample set; and determine whether the target object is the living body according to the one or more features, the first classifier, and the second classifier.

5. The terminal device of claim 4, wherein the AP configured to determine the difference image of the first image and the second image is configured to:

obtain a binarized first image by performing a binarization process on the first image;

obtain a binarized second image by performing a binarization process on the second image; and obtain the difference image by calculating an absolute value of a difference between each pixel of the binarized first image and each corresponding pixel of the binarized second image.

6. The terminal device of claim 4, wherein the AP configured to determine the difference image of the first image and the second image is configured to:

extract, from the first image, a first target image corresponding to the target object;

extract, from the second image, a second target image corresponding to the target object;

adjust an image resolution of the first target image to be consistent with an image resolution of the second target image; and determine a difference image of the adjusted first target image and the second target image as the difference image of the first image and the second image.

* * * * *